United States Patent
Gokita

(10) Patent No.: US 10,713,182 B2
(45) Date of Patent: Jul. 14, 2020

(54) INFORMATION PROCESSING APPARATUS AND METHOD

(71) Applicant: FUJITSU LIMITED, Kawasaki-shi, Kanagawa (JP)

(72) Inventor: Shun Gokita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 16/032,407

(22) Filed: Jul. 11, 2018

(65) Prior Publication Data

US 2019/0018797 A1 Jan. 17, 2019

(30) Foreign Application Priority Data

Jul. 14, 2017 (JP) .................................. 2017-137928

(51) Int. Cl.
*G06F 12/12* (2016.01)
*G06F 12/122* (2016.01)
*G06F 3/06* (2006.01)
*G06F 12/0811* (2016.01)

(52) U.S. Cl.
CPC .......... *G06F 12/122* (2013.01); *G06F 3/0604* (2013.01); *G06F 12/0811* (2013.01); *G06F 2212/1024* (2013.01)

(58) Field of Classification Search
CPC .... G06F 3/0604; G06F 12/121; G06F 12/122; G06F 12/127; G06F 12/0811; G06F 2212/1024; G06F 2212/69
USPC .......................................... 711/134, 136, 171
See application file for complete search history.

(56) References Cited

U.S. PATENT DOCUMENTS

| | | | | |
|---|---|---|---|---|
| 6,385,699 | B1* | 5/2002 | Bozman | G06F 12/121 709/217 |
| 8,788,758 | B1* | 7/2014 | de la Iglesia | G06F 12/123 711/136 |
| 2009/0177844 | A1* | 7/2009 | Naylor | G06F 12/122 711/136 |
| 2011/0093654 | A1* | 4/2011 | Roberts | G06F 1/3203 711/105 |

(Continued)

FOREIGN PATENT DOCUMENTS

| | | |
|---|---|---|
| JP | 2016-170729 | 9/2016 |
| JP | 2017-058955 | 3/2017 |

OTHER PUBLICATIONS

M. Blott et al., "Scaling out to a Single-Node 80Gbps Memcached Server with 40Terabytes of Memory", HotStorage 2015 Proceedings of the 7th USENIX Conference on Hot Topics in Storage and File Systems (6 pages).

*Primary Examiner* — Gary J Portka
(74) *Attorney, Agent, or Firm* — Fujitsu Patent Center

(57) ABSTRACT

An information processing apparatus includes a first memory, a second memory, and a processor coupled to the first memory and the second memory. The first memory is configured to store data and has a first access speed. The second memory is configured to store data and has a second access speed different from the first access speed. The processor is configured to determine respective storage destinations of first data stored in the first memory and second data stored in the second memory from among the first memory and the second memory based on a first access probability and a first latency of the first data and a second access probability and a second latency of the second data.

17 Claims, 14 Drawing Sheets

(56) References Cited

U.S. PATENT DOCUMENTS

2016/0267008 A1 9/2016 Takeda
2017/0075808 A1 3/2017 Noguchi et al.

\* cited by examiner

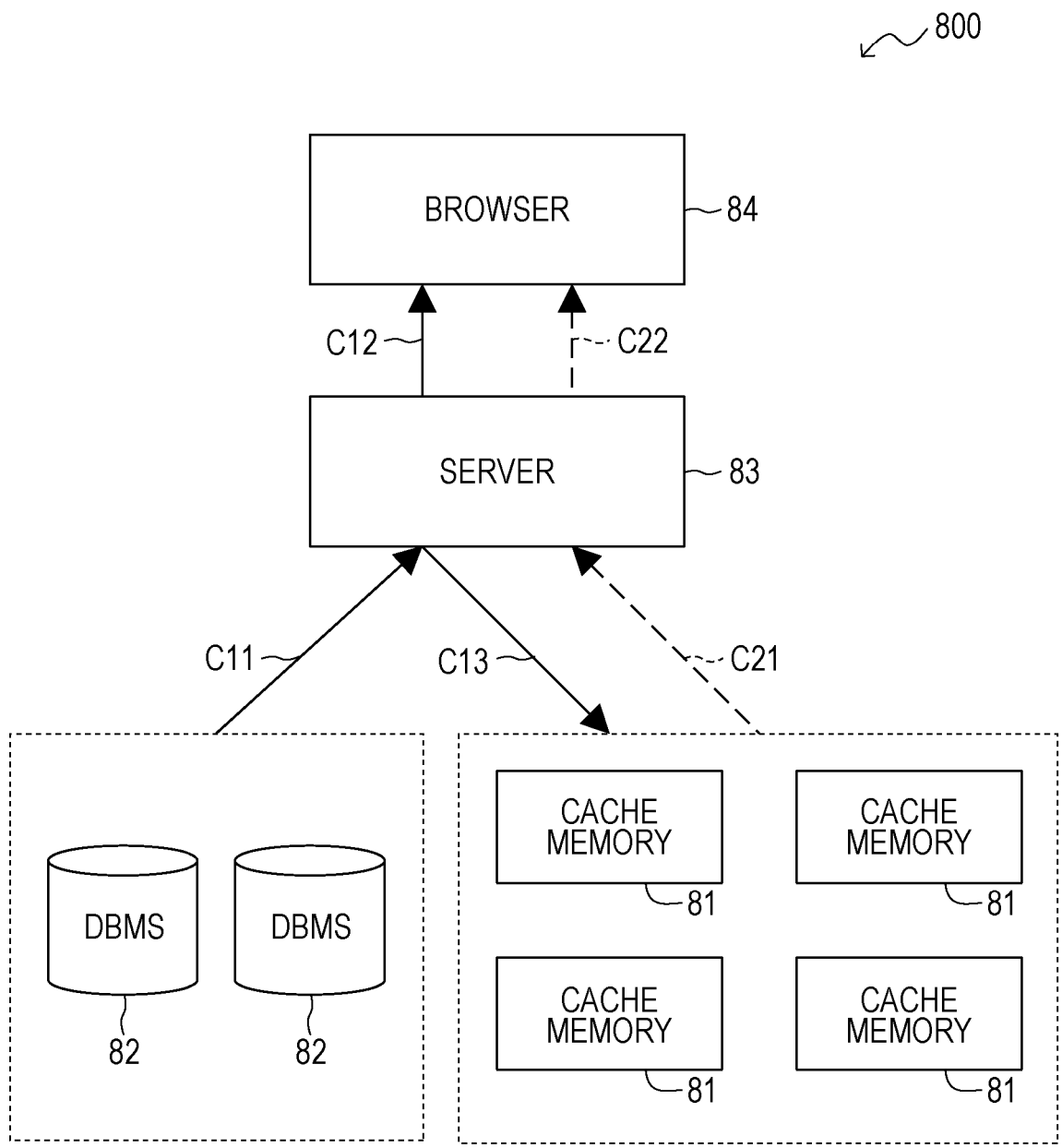

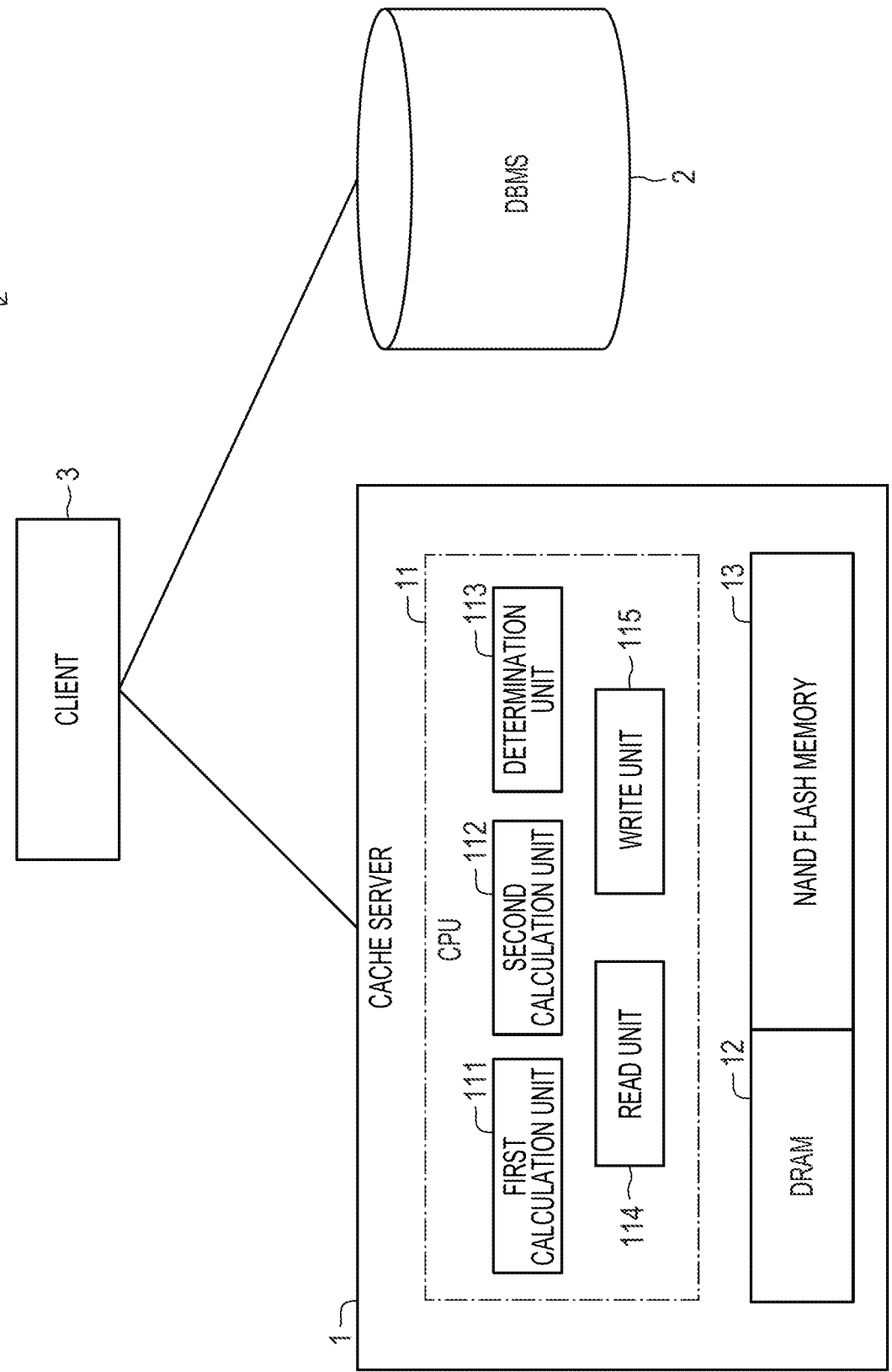

INFORMATION PROCESSING APPARATUS AND METHOD

CROSS-REFERENCE TO RELATED APPLICATION

This application is based upon and claims the benefit of priority of the prior Japanese Patent Application No. 2017-137928, filed on Jul. 14, 2017, the entire contents of which are incorporated herein by reference.

FIELD

The embodiments discussed herein are related to an information processing apparatus and a method for processing information.

BACKGROUND

A capacity of a dynamic random access memory (DRAM) used as a main memory of a computer has recently approached the limit. On the other hand, as represented by analysis of big data and machine learning, a demand for processing large capacities of data at high speed by in-memory computing is increasing.

In an application using a huge memory space, researches are conducted to extend the memory space using a next generation nonvolatile memory. The next generation nonvolatile memory is, for example, a NAND flash memory and may be a low speed and large capacity memory. The next generation nonvolatile memory may be used in combination with a high-speed small-capacity memory such as DRAM.

A cache server including the DRAM and the NAND flash memory has a problem that the unit price per capacity of the DRAM is high and the power consumption is large. If the memory space of the cache server is expanded using the NAND flash memory of which the capacity unit price is cheaper than that of the DRAM, the cost problem is solved. However, the NAND flash memory has a speed which is about three orders of magnitude lower than the DRAM. Therefore, in the cache server, in order to achieve both high speed and low price, it is assumed that the DRAM and the NAND flash memory are separately used appropriately.

FIG. 1 is a diagram illustrating an example of a change in latency in the DRAM and the NAND flash memory. In FIG. 1, a horizontal axis represents a data size (kilobytes; KB), and a vertical axis represents the latency (nanoseconds; ns).

In the example illustrated in FIG. 1, a change in the latency of the DRAM (A1) when the data size is increased is smaller than a change in the latency of the NAND flash memory (A2). The NAND and the DRAM, which are a value obtained by dividing the latency of the NAND flash memory by the latency of the DRAM, becomes smaller as the data size increases (A3). The data may be referred to as an item.

As appropriate separate use of the DRAM and the NAND flash memory, for example, separate use of the memories depending on access frequency and separate use of the memories depending on item size are assumed.

The separate use of the memories depending on access frequency may be performed by arranging frequently accessed items in the DRAM and infrequently accessed items in the NAND flash memory.

The separate use of the memories depending on access frequency is effective for workloads that are biased in access frequency.

FIG. 2 illustrates an example of the separate use of the memories depending on access frequency. In an example illustrated in (1) of FIG. 2, when storing items in an order of access frequency, a degree of popularity (which may be referred to as "access frequency") of an item C stored in the DRAM is higher than the popularity degree of items D and E stored in the NAND flash memory.

In an example illustrated in (2) of FIG. 2, when an item stored in the NAND flash memory is read, a storage destination of the item is changed to the DRAM.

In an example illustrated in (3) of FIG. 2, when an item stored in the NAND flash memory is read out and there is no spare capacity in the DRAM for storing the item, it is assumed that the item is stored in the DRAM by pushing out an item stored in the DRAM to the NAND flash memory.

As described above, it is assumed that storage destinations of items stored in the memories having different speeds are changed. The above description is an example of the case where the storage destination of the item is changed.

The separate use of the memories depending on item size may be performed by arranging an item having a size less than a certain size in the DRAM and arranging an item having a size equal to or larger than the certain size in the NAND flash memory.

Related techniques are disclosed in, for example, Japanese Laid-open Patent Publication No. 2016-170729, Japanese Patent No. 5992592, and M. Blott, L. Liu, K. Karras, and K. Vissers, "Scaling Out to a Single-Node 80 Gbps Memcached Server with 40 Terabytes of Memory HotStorage", 2015.

However, in the separate use of the memories depending on access frequency, there is a possibility that response is deteriorated by changing the storage destination of the items arranged in the memories having different speeds.

SUMMARY

According to an aspect of the present invention, provide is an information processing apparatus including a first memory, a second memory, and a processor coupled to the first memory and the second memory. The first memory is configured to store data and has a first access speed. The second memory is configured to store data and has a second access speed different from the first access speed. The processor is configured to determine respective storage destinations of first data stored in the first memory and second data stored in the second memory from among the first memory and the second memory based on a first access probability and a first latency of the first data and a second access probability and a second latency of the second data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a data cache operation in a related example;

FIG. 7 is a diagram illustrating an exemplary system configuration of a cache system according to an embodiment;

DESCRIPTION OF EMBODIMENTS

Figure 1:
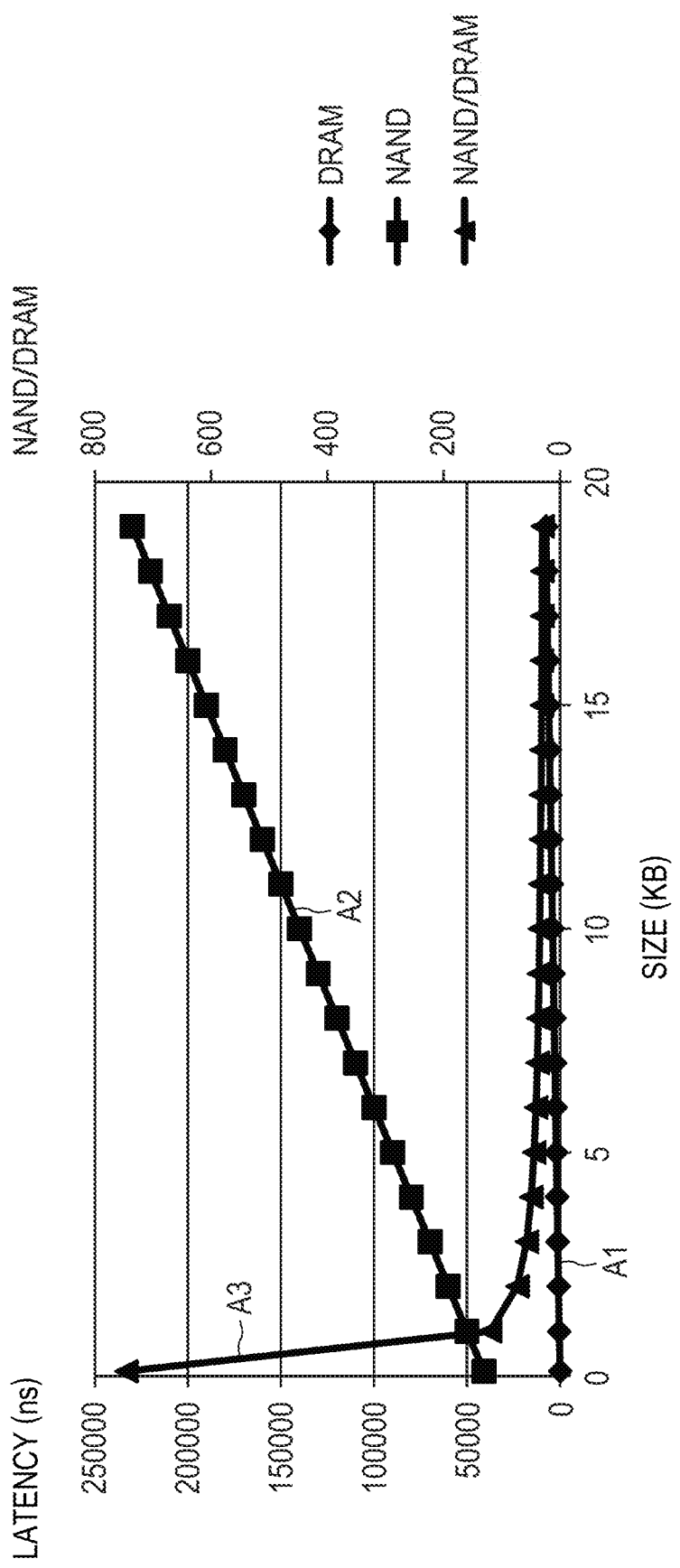
FIG. 1 is a diagram illustrating an example of a change in latency in DRAM and NAND flash memories.
Figure 2:
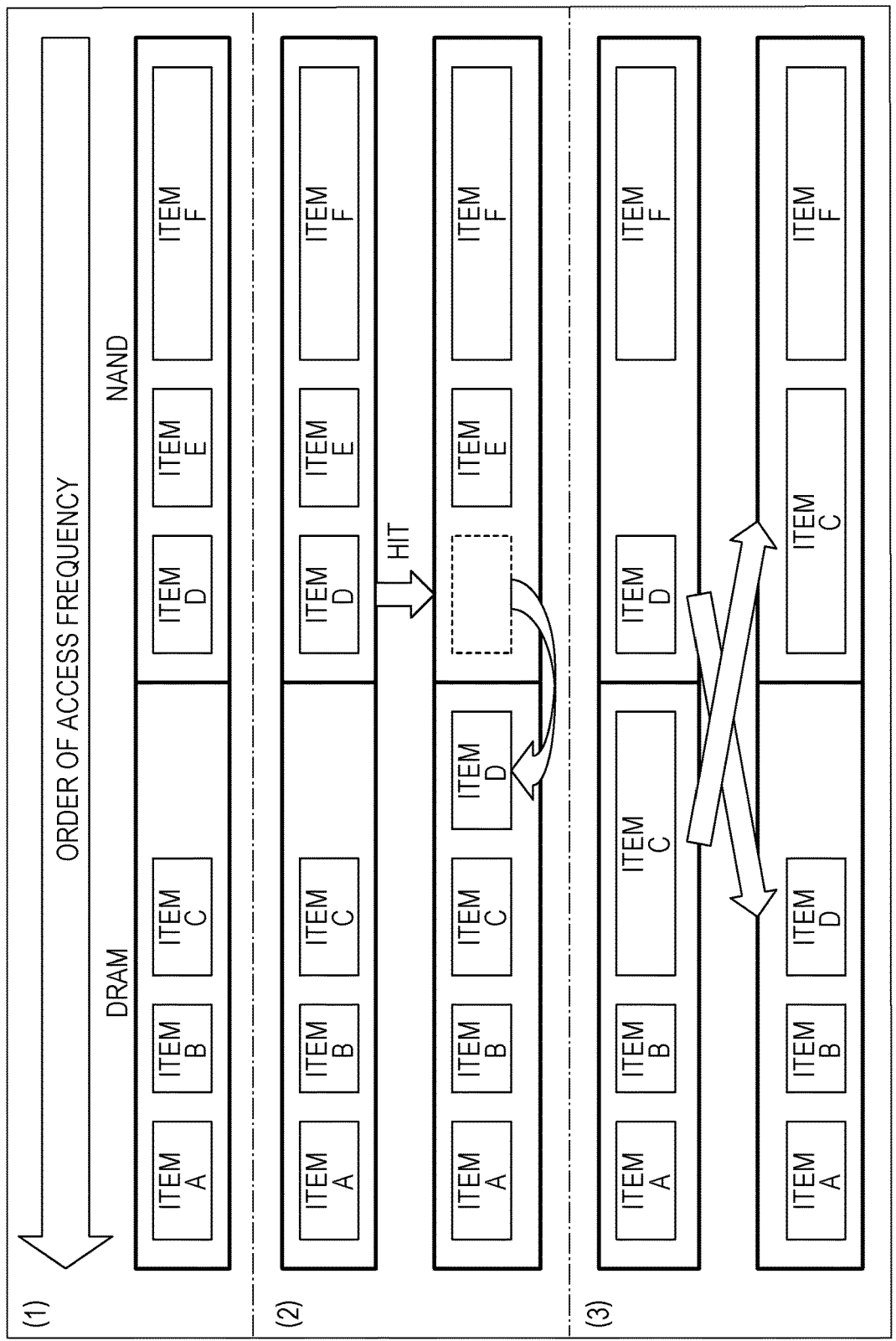
FIG. 2 is a diagram illustrating an example of a separate use of memories depending on item frequency.

Hereinafter, embodiments will be described with reference to drawings. However, the following embodiments are merely an example, and not intended to exclude the application of various kinds of modified examples or techniques that are not set forth in the embodiments. That is, various modifications may be made on the present embodiments within a range not departing from the gist thereof.

Each drawing is not intended to include only components illustrated in each drawing and may include another function or the like.

Hereinafter, in the drawings, since the same reference numerals denote the same portions, a description thereof will be omitted.

(A) Related Technique

FIG. 3 is a diagram illustrating a data cache operation in a related example.

A cache system 800 illustrated in FIG. 3 is a system in which a large amount of access concentrates, and includes a plurality (four in the illustrated example) of cache memories 81, a plurality (two in the illustrated example) of database management systems (DBMS) 82 and a server 83. Data acquired from the cache memory 81 or the DBMS 82 by the server 83 may be displayed on a browser 84 by a terminal (not illustrated).

The cache memory 81 is a storage device including a random access memory (RAM). The cache memory 81 may be provided in a cache server (not illustrated). The cache server included in the cache system 800 as illustrated in FIG. 3 may be referred to as an in-memory cache server. The cache server caches items acquired from the DBMS 82 and transmits the cached items to the server 83 in response to a request from the server 83.

The cache memory 81 may be, for example, a DRAM. In recent years, next generation nonvolatile memories such as PCM, ReRAM, MRAM, or 3DXpoint have appeared as an alternative to the DRAM. The PCM is an abbreviation for a phase change memory and the ReRAM is an abbreviation for a resistive random access memory. The MRAM is an abbreviation for a magnetoresistive random access memory, and the 3DXpoint is an abbreviation for a three dee cross point. These next generation nonvolatile memories are capable of byte access, for example, and may operate faster than conventional nonvolatile memories. On the other hand, compared to the DRAM 12, the next generation nonvolatile memory has a performance in which the latency is large (in other words, "the reading performance is low") and the writing performance is low.

The DBMS 82 is a device that stores data in a readable and writable manner, and is, for example, a hard disk drive (HDD). The DBMS 82 may be a relational database management system (RDBMS).

The server 83 is a computer having a server function. The server 83 may be referred to as an application server or a web server.

The data that is firstly accessed in the cache system 800 is acquired from the DBMS 82 by the server 83 (C11). The server 83 transmits the acquired data to the browser 84 that has requested the access (C12). The server 83 stores the acquired data in the cache memory 81 (C13).

On the other hand, the data accessed the second time and thereafter in the cache system 800 is acquired from the cache memory 81 by the server 83 (C21). The server 83 transmits the acquired data to the browser 84 that has requested the access (C22).

An access speed is slow in the disk based DBMS 82. However, as described above, once accessed data is cached in the cache memory 81. Therefore, the server 83 may return the response of the data accessed the second time and thereafter to the browser 84 at a high speed.

Figure 4A:
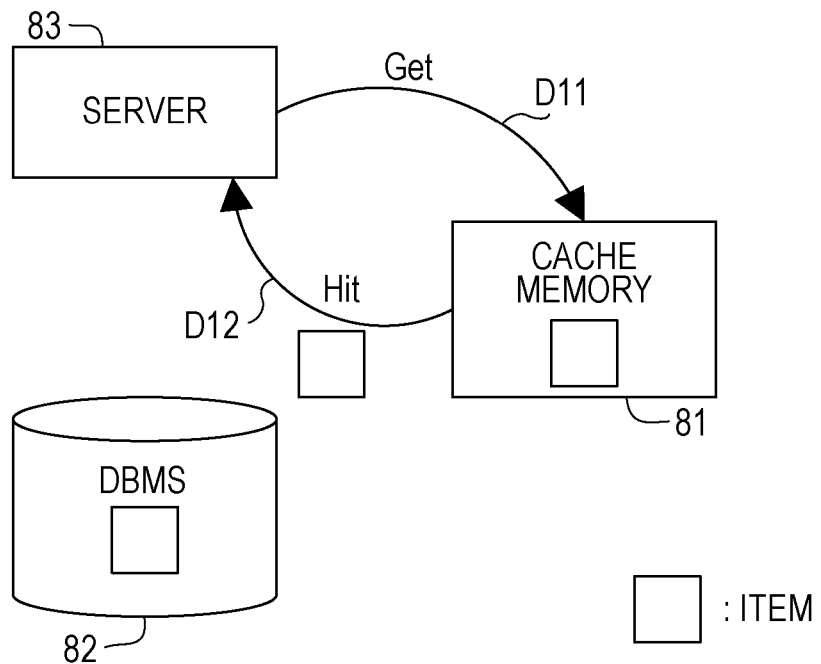
FIGS. 4A and 4B are diagrams illustrating an operation at a time of cache hit and an operation at a time of cache miss, respectively, in a related example.
Figure 4B:
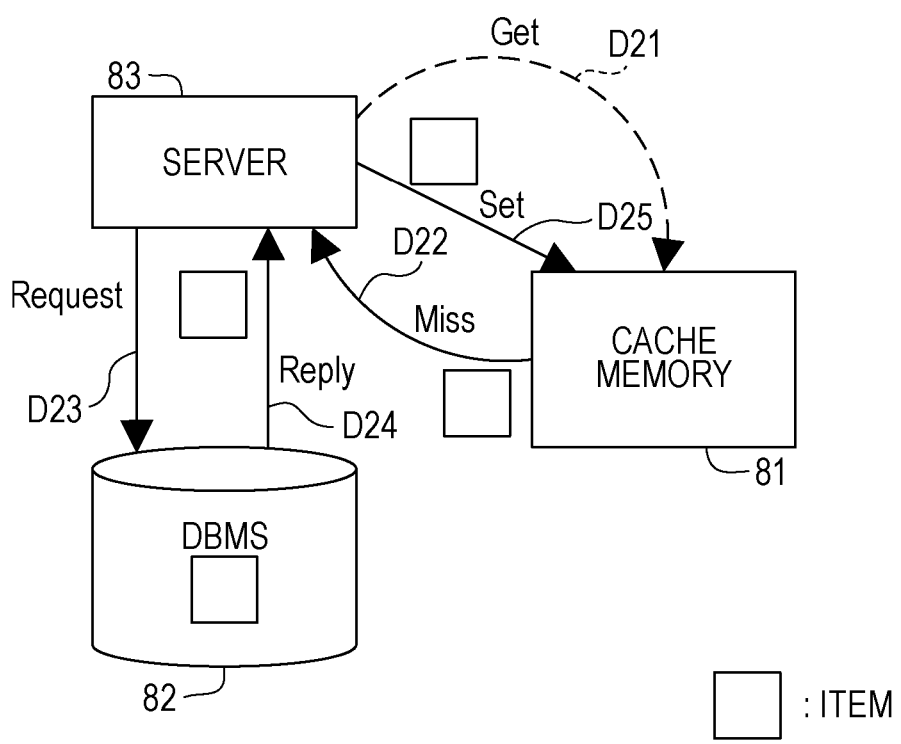

FIG. 4A is a diagram illustrating an operation at a time of cache hit in the related example. FIG. 4B is a diagram illustrating an operation at a time of cache miss in the related example. Squares in FIGS. 4A and 4B indicate items.

As illustrated in FIG. 4A, the server 83 inquires the cache memory 81 as to whether the desired item is cached in the cache memory 81 (D11).

In a case where a desired item is hit in the cache memory 81, the server 83 acquires a desired item from the cache memory 81 (D12).

That is, at the time of the cache hit, the server 83 directly acquires the item from the cache memory 81.

As illustrated in FIG. 4B, the server 83 inquires the cache memory 81 as to whether the desired item is cached in the cache memory 81 (D21).

In a case where the desired item does not hit in the cache memory 81, the server 83 acquires information indicating that the cache miss occurs from the cache memory 81 (D22).

The server 83 requests the desired item from the DBMS 82 (D23).

The server 83 acquires the desired item from the DBMS 82 (D24).

The server 83 sets the acquired item in the cache memory 81 (D25)

That is, at the time of the cache miss, the server 83 acquires the item from the DBMS 82 and sets the acquired item in the cache memory 81.

Figure 5:
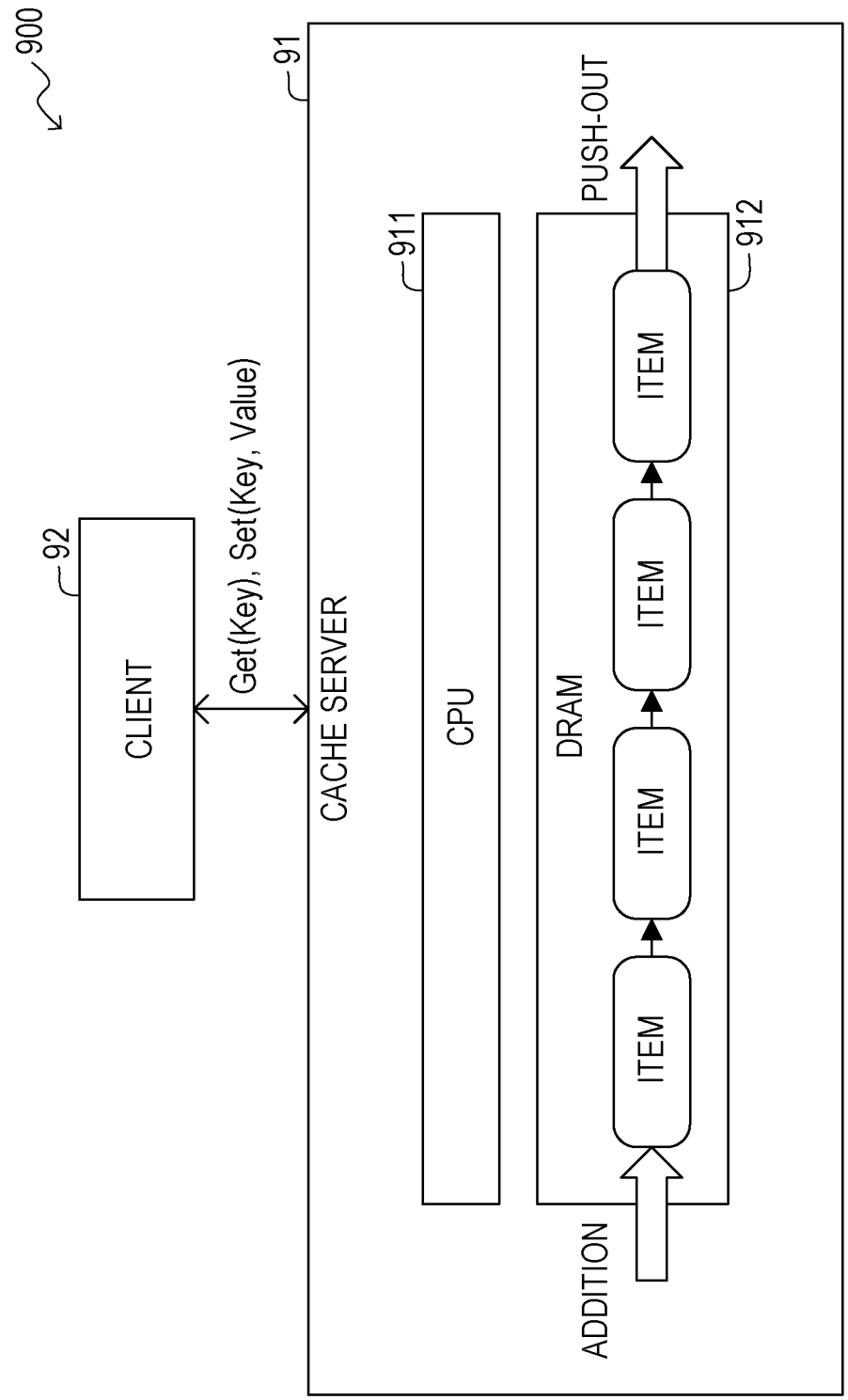
FIG. 5 is a diagram illustrating an operation performed by a cache server in a related example.

FIG. 5 is a diagram illustrating an operation performed by a cache server in the related example.

A cache system 900 illustrated in FIG. 5 includes a cache server 91 and a client 92.

The client 92 may be a computer having a server function.

The cache server 91 caches the item acquired from the DBMS (not illustrated in FIG. 5) and transmits the cached item to the client 92 in response to the request from the client 92. The cache server 91 includes a central processing unit (CPU) 911 and a DRAM 912.

The CPU 911 is a processing device that performs various controls and calculations.

The DRAM 912 stores a part of the items stored in the DBMS (not illustrated in FIG. 5).

The client 92 acquires an item held by the cache server 91 by a "Get" command.

The client 92 may acquire a target item from the cache server 91 with a key for the desired item as an index.

The client 92 adds or updates the key which is an index of the item and a value which indicates contents of the item to the cache server 91 by a "Set" command. In the cache server 91, in a case where the capacity of the DRAM 912 is full, the CPU 911 may push out the items stored in the DRAM 912 by a push-out algorithm and add a new item to the DRAM 912. One example of the push-out algorithm is Least Recently Used (LRU) or Least Frequently Used (LFU).

(B) An Embodiment (B-1) Outline

Figure 6:
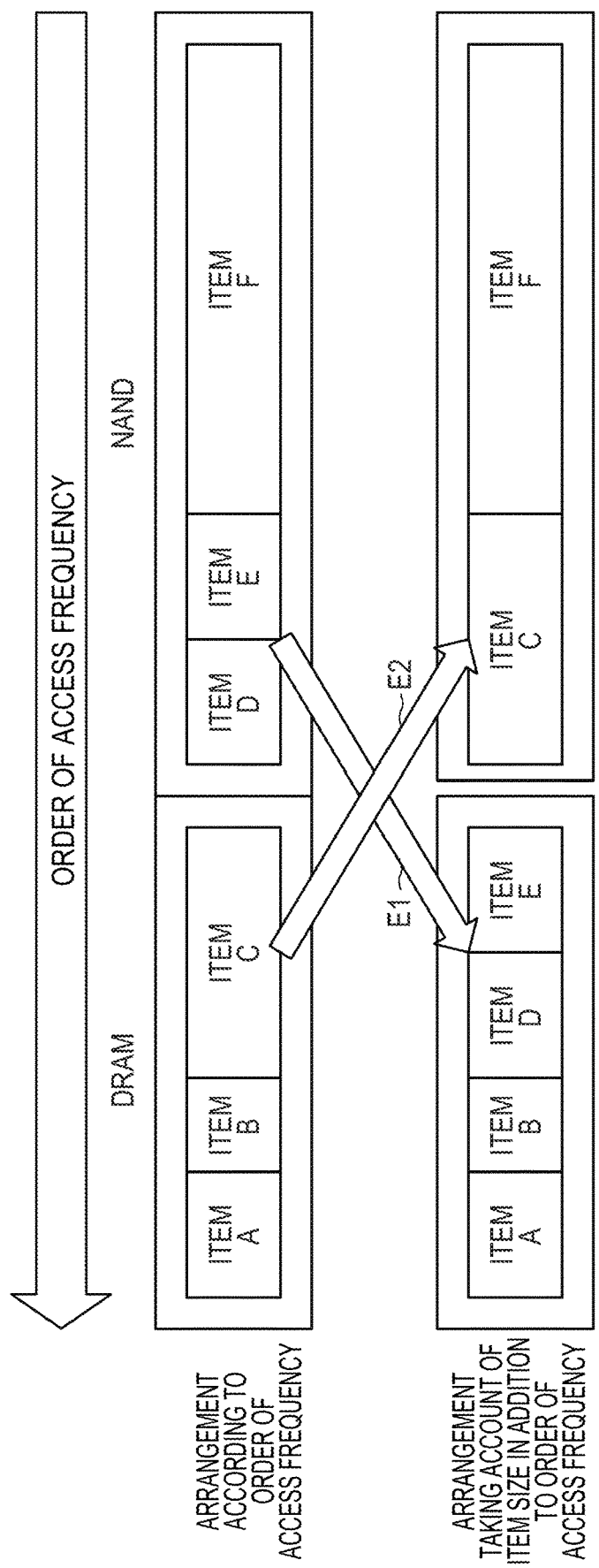
FIG. 6 is a diagram illustrating an exemplary operation of moving data performed by a cache server according to an embodiment.

FIG. 6 is a diagram illustrating an exemplary operation of moving data performed by a cache server according to an embodiment.

A cache server 1 (described later with reference to FIG. 7 and the like) according to the present embodiment determines a memory serving as a storage destination of each item by an online item arrangement algorithm in consideration of the access frequency and the latency of the cached data. Here, "online" means that the storage destination of the data may be changed dynamically. The data may be referred to as an item and the storage destination may be referred to as an arrangement destination.

The storage destination of each item may be determined so as to replace items between the DRAM 12 and a NAND flash memory 13 in consideration of the latency determined in accordance with the size of the item in addition to the order of access frequency. The replacement of items may be performed such that evaluation values in the entire cache memory are optimized. The DRAM 12 and the NAND flash memory 13 will be described later with reference to FIG. 7 and the like. The evaluation value will be described later with reference to FIG. 9 and the like.

In an example illustrated in FIG. 6, in the arrangement according to the order of access frequency, a degree of popularity (which may be referred to as "access frequency") of an item C stored in the DRAM 12 is higher than the popularity degree of items D and E stored in the NAND flash memory 13. Here, in addition to the order of access frequency, the improvement of the latency when the items D and E are moved to the DRAM 12 (E1) and reduction of latency in a case where the item C is moved to the NAND flash memory 13 (E2) are considered. It may be determined whether to replace the items such that the cache memory as a whole gets the benefits in consideration of the gain due to the improvement of the latency of the items D and E and the reduction of the latency of the item C.

(B-2) Exemplary System Configuration

FIG. 7 is a diagram illustrating an exemplary system configuration of a cache system according to the present embodiment.

A cache system 100 illustrated in FIG. 7 is an example of an information processing system, and includes a cache server 1, a DBMS 2, and a client 3.

The client 3 is an example of a higher-level device, and requests the cache server 1 to read desired data. Further, when desired data is not stored in the cache server 1, the client 3 reads out the desired data from the DBMS 2 and stores the read data in the cache server 1.

The DBMS 2 is an example of a storage device. The DBMS 2 is a device that stores data in a readable and writable manner, and is, for example, an HDD. The DBMS 2 may be an RDBMS.

The cache server 1 is an example of an information processing apparatus and stores a part of data among the data stored in the DBMS 2 in order to improve response performance to the client 3. As illustrated in FIG. 7, the cache server 1 includes a CPU 11, the DRAM 12, and the NAND flash memory 13.

The DRAM 12 is an example of a first memory that stores first data and is a volatile storage device that may store data in a readable and writable manner.

The NAND flash memory 13 is an example of a second memory that stores second data and is a nonvolatile storage device that may store data in a readable and writable manner.

An access speed of the DRAM 12 is higher than that of the NAND flash memory 13. A storage capacity of the NAND flash memory 13 is larger than that of the DRAM 12.

The DRAM 12 and the NAND flash memory 13 may be referred to as cache memories, respectively. The two kinds of cache memories provided in the cache server 1 are not limited to the DRAM 12 and the NAND flash memory 13 but any memories as long as the access speeds are different from each other. For example, the cache server 1 may include a hierarchical memory having memory elements with a plurality of access speeds as a cache memory.

The CPU 11 is a processing device that performs various controls and calculations, and executes an operating system (OS) and a program read into the DRAM 12, for example, from an auxiliary storage device (not illustrated) provided in the cache server 1, thereby realizing various functions. That is, as illustrated in FIG. 7, the CPU 11 may function as a first calculation unit 111, a second calculation unit 112, a determination unit 113, a read unit 114, and a write unit 115.

Programs for realizing the functions of the first calculation unit 111, the second calculation unit 112, the determination unit 113, the read unit 114, and the write unit 115 may be provided in a state where the programs are recorded in a computer-readable recording medium. The computer-readable recording medium may be, for example, a flexible disk, a compact disc (CD), a digital versatile disc (DVD), a Blu-ray disc, a magnetic disk, an optical disc, or a magneto-optical disc. The CD may be a CD-ROM, for example, CD-R or CD-RW. The DVD may be DVD-ROM, DVD-RAM, DVD-R, DVD+R, DVD-RW, DVD+RW, or HD DVD, for example. The computer (for example, the CPU 11) reads the program from the above-described recording medium through a read device (not illustrated) and transfers the read program to an internal record device or an external record device for storage. The program may be recorded in a storage device (recording medium) such as a magnetic disk, an optical disc, or a magneto-optical disc and may be provided from the storage device to the computer via a communication path.

When implementing the functions of the first calculation unit 111, the second calculation unit 112, the determination unit 113, the read unit 114, and the write unit 115, a program stored in the internal storage device (for example, the DRAM 12) may be implemented by the computer (for example, the CPU 11). The computer may read and execute the program recorded on the recording medium.

The functions of the first calculation unit 111, the second calculation unit 112, and the determination unit 113 will be described later with reference to FIG. 9 and the like.

The read unit 114 reads data from the DRAM 12 or the NAND flash memory 13 in response to a data read request from the client 3.

In a case where the data to be read by the client 3 does not exist in the DRAM 12 or the NAND flash memory 13, the write unit 115 writes data acquired from the DBMS 2 into the DRAM 12. Acquisition of data from the DBMS 2 may be performed via the client 3.

Movement of data between the DRAM 12 and the NAND flash memory 13 may be performed by the read unit 114 and the write unit 115. That is, as will be described later, the read unit 114 reads data determined to be moved between the DRAM 12 and the NAND flash memory 13 by the determination unit 113 from the DRAM 12 or the NAND flash memory 13. The write unit 115 writes the data read out by the read unit 114 in the NAND flash memory 13 or the DRAM 12 serving as the movement destination.

Figure 8A:
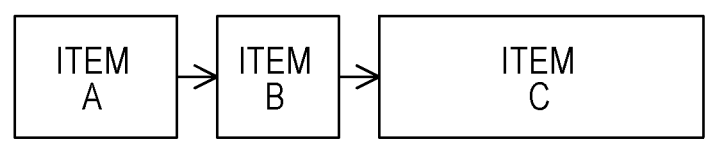
FIGS. 8A and 8B are diagrams illustrating a method of managing items in a cache memory included in a cache server according to an embodiment.
Figure 8B:
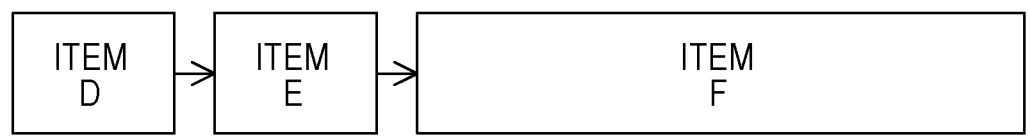

FIG. 8A is a diagram illustrating a method of managing items in the DRAM 12 of the cache server 1 according to the present embodiment. FIG. 8B is a diagram illustrating a method of managing items in the NAND flash memory 13 of the cache server 1 according to the present embodiment.

As illustrated in FIGS. 8A and 8B, in each of the DRAM 12 and the NAND flash memory 13, the access frequency may be managed by one LRU list. Because the data capacity is restricted in the DRAM 12 and the NAND flash memory 13, the length of the LRU list is not fixed length and may be variable length. The number of items stored may vary depending on the size of items stored in DRAM 12 and NAND flash memory 13.

The write unit 115 may write items to be added as new cache data from the DBMS 2 to the DRAM 12. The write unit 115 may arrange items pushed out from the LRU list of the DRAM 12 at the head of the LRU list of the NAND flash memory 13.

In the example illustrated in FIG. 8A, the cache data items are arranged in the order of an item A, an item B, and an item C in the LRU list of the DRAM 12. In the example illustrated in FIG. 8B, the cache data items are arranged in the order of an item D, an item E, and an item F in the LRU list of the NAND flash memory 13.

Figure 9:
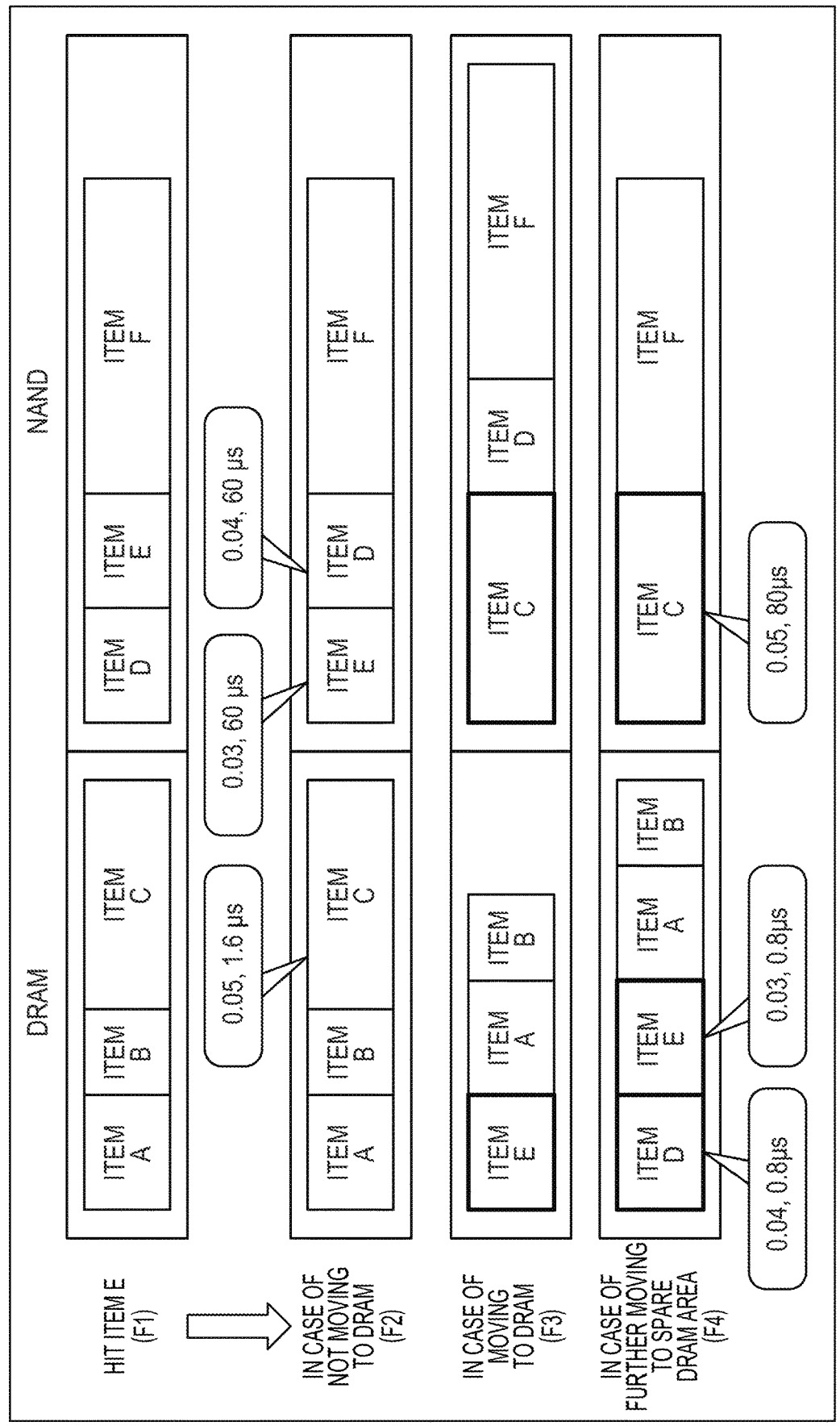
FIG. 9 is a diagram illustrating a process of moving items performed by a cache server according to an embodiment.

FIG. 9 is a diagram illustrating a process of moving items performed by the cache server 1 according to the present embodiment.

The sizes of the items A to F illustrated in FIG. 9 are proportional to the data size of each item. For example, the item A has a larger data size than that of the item B, and the item B has a data size smaller than that of the item C. In addition, the item A, the item D, and the item E have the same data size to each other.

As in a state F1, the cache data items are arranged in the order of the item A, the item B, the item C in the LRU list of the DRAM 12. In the LRU list of the NAND flash memory 13, the cache data items are arranged in the order of the item D, the item E, and the item F. In this state, it is assumed that a cache hit for item E occurs.

As in a state F2, in a case where the item E, for which a cache hit occurs, is not moved to the DRAM 12, the cache data items are arranged in the order of the item A, the item B, and the item C in the LRU list of the DRAM 12, similar to the state F1. On the other hand, in the LRU list of the NAND flash memory 13, the arrangement of the cache data items changes to the order of the item E, the item D, and the item F, starting with the item E having the cache hit.

As in a state F3, in a case where the item E having a cache hit is moved to the DRAM 12, the item C arranged at the end of the LRU list of the DRAM 12 moves to the NAND flash memory 13 in replacement of the item E. In the LRU list of the DRAM 12, the arrangement of the cache data items changes to the order of the item E, the item A, and the item B, starting with the item E moved from the NAND flash memory 13. In the LRU list of the NAND flash memory 13, the arrangement of the cache data items changes to the order of the item C, the item D, and the item F, starting with the item C moving from the DRAM 12.

In the example illustrated in FIG. 9, the data size of the item E is smaller than the data size of the item C. Therefore, in the state F3, even if the item E is registered in the DRAM 12, there is spare capacity in the storage capacity of the DRAM 12.

Therefore, as in a state F4, the item D secondly arranged in the LRU list of the NAND flash memory 13 in the state F2 may also be moved to the DRAM 12 in addition to the item E. Accordingly, in the LRU list of the DRAM 12, the arrangement of the cache data items changes to the order of the item D, the item E, the item A, and the item B, starting with the item D which is moved additionally from the NAND flash memory 13. In the LRU list of the NAND flash memory 13, the arrangement of the cache data items changes to the order of the item C and the item F excluding the item D that is moved to the DRAM 12.

The first calculation unit 111 calculates a first evaluation value in a case where the cache hit data is moved to the DRAM 12.

The second calculation unit 112 calculates a second evaluation value in a case where the cache hit data is not moved to the DRAM 12.

The evaluation value may be calculated using the access probability and the latency of the item serving as a candidate for movement (may be referred to as "movement target") between the DRAM 12 and the NAND flash memory 13. The evaluation value may be referred to as average latency or average read time.

The first calculation unit 111 calculates, as a first evaluation value, a sum of the products of the access probability and the latency of the respective data serving as candidates for movement in the case of moving items between the DRAM 12 and the NAND flash memory 13. In other words, in the case of moving items between the DRAM 12 and the NAND flash memory 13, the first calculation unit 111 calculates the product of the access probability and the latency for each item serving as a candidate for movement, and adds up the products calculated for the respective items.

The second calculation unit 112 calculates, as a second evaluation value, a sum of the products of the access probability and the latency of the respective data serving as candidates for movement in the case of not moving items between the DRAM 12 and the NAND flash memory 13. In other words, in the case of not moving items between the DRAM 12 and the NAND flash memory 13, the second calculation unit 112 calculates the product of the access probability and the latency for each item serving as a candidate for movement, and adds up the products calculated for the respective items.

The latency may be referred to as read time or access time.

The determination unit 113 determines the storage destination from among the DRAM 12 and the NAND flash memory 13 for data serving as a candidate for movement based on the access probability and the latency of the data serving as a candidate for movement. In other words, in a case where the first evaluation value is smaller than the second evaluation value, the determination unit 113 determines to move data stored in the DRAM 12 to the NAND flash memory 13. In addition, in a case where the first evaluation value is smaller than the second evaluation value, the determination unit 113 determines to move data stored in the NAND flash memory 13 to the DRAM 12. In a case where the first evaluation value is equal to or larger than the second evaluation value, the determination unit 113 determines not to move items between the DRAM 12 and the NAND flash memory 13.

The first calculation unit 111 and the second calculation unit 112 may estimate the access probability for each item based on statistical information including the number of times the read unit 114 actually reads from the DRAM 12 and the NAND flash memory 13. The access probability of each item may be calculated by dividing the number of accesses to each item by the number of accesses to all the items stored in the DRAM 12 and the NAND flash memory 13.

The first calculation unit 111 and the second calculation unit 112 may calculate the latency of each item using the following functions for the DRAM 12 and the NAND flash memory 13, respectively.

For example, in the calculation of the latency for the DRAM 12 having a chip specification DDR 3-2133, the following Expression 1 is used. ItemSize indicates the size of the item. The unit MT/s indicates the number of times data may be transferred per second.

$$L_{DRAM}(\text{ItemSize}) = \text{ItemSize}/(2133 \text{ MT/s} * 8 \text{ B}) \quad \text{(Expression 1)}$$

In the calculation of the latency for the NAND flash memory 13, the following Expression 2 is used. BusyTime indicates the time from the occurrence of an access request to the NAND flash memory 13 until the data starts to be output from the NAND flash memory 13. In addition, BW indicates a bandwidth between the NAND flash memory 13 and a host memory (not illustrated) in the CPU 11. The BusyTime is 50 μs and the BW is 400 MB/s.

$$L_{NAND}(\text{ItemSize}) = \text{BusyTime} + \text{ItemSize}/\text{BW} \quad \text{(Expression 2)}$$

In the example illustrated in FIG. 9, items serving as candidates for movement are the items C, D, and E. The access probability and the latency of the item C, the item D, and the item E in the case of moving the item E to the DRAM 12 and further moving the item D to the spare area of the DRAM 12 are as indicated in the state F4. That is, for the item C, the access probability is 0.05, and the latency in the NAND flash memory 13 is 80 μs. For the item D, the access probability is 0.04, and the latency in DRAM 12 is 0.8 μs. Furthermore, for the item E, the access probability is 0.03, and the latency in DRAM 12 is 0.8 μs.

In the example as indicated in the state F4 of FIG. 9, the first calculation unit 111 calculates the first evaluation value by the following Expression 3.

$$0.05*80 + 0.04*0.8 + 0.03*0.8 = 4.06 \text{ μs} \quad \text{(Expression 3)}$$

In the example illustrated in FIG. 9, the access probability and the latency of the item C, the item D, and the item E in a case where the items E and D are not moved to the DRAM 12 are as indicated in the state F2. That is, for the item C, the access probability is 0.05, and the latency in DRAM 12 is 1.6 μs. For the item D, the access probability is 0.04, and the latency in NAND flash memory 13 is 60 μs. Further, for the item E, the access probability is 0.03, and the latency in the NAND flash memory 13 is 60 μs.

In the example as indicated in the state F2 of FIG. 9, the second calculation unit 112 calculates the second evaluation value by the following Expression 4.

$$0.05*1.6 + 0.04*60 + 0.03*60 = 4.28 \text{ μs} \quad \text{(Expression 4)}$$

In a case where the first evaluation value calculated by the first calculation unit 111 is smaller than the second evaluation value calculated by the second calculation unit 112, the determination unit 113 determines to move the items serving as candidates for movement. In the example illustrated in FIG. 9, the first evaluation value 4.06 μs is smaller than the second evaluation value 4.28 μs. Therefore, as indicated in the state F4, the determination unit 113 determines to move the items D and E stored in the NAND flash memory 13 to the DRAM 12 and move the item C stored in the DRAM 12 to the NAND flash memory 13.

In the example indicated in the state F4, the item D is arranged at the head of the LRU list of the DRAM 12. However, it is not limited thereto. Since there is no cache hit for the item D, the item D may be arranged at a lower position such as the second, the end, or the like in the LRU list of the DRAM 12.

(B-3) Exemplary Operation

Figure 10:
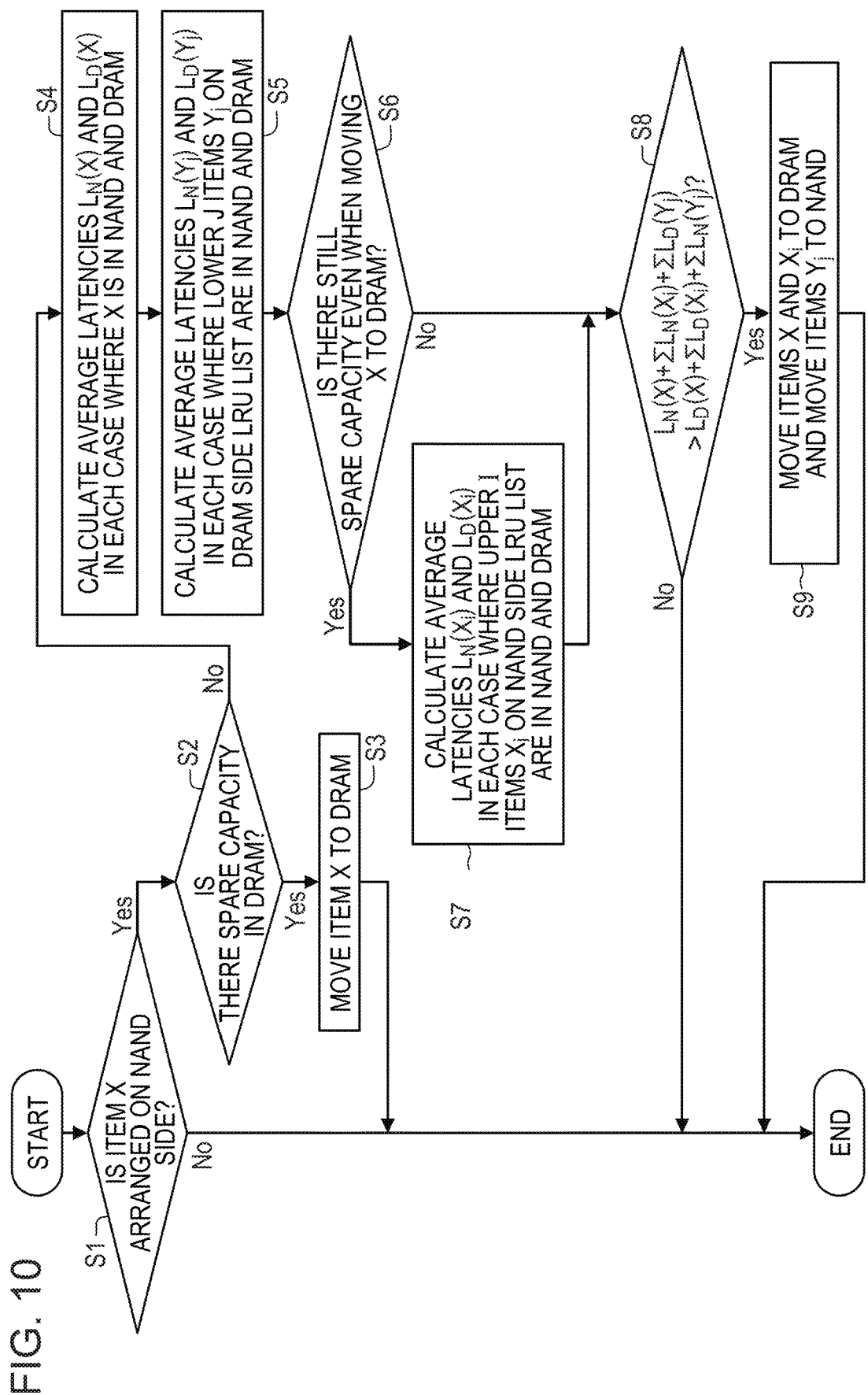
FIG. 10 is a flowchart illustrating a process of a determination on movement of an item performed by a cache server according to an embodiment.

A process of a determination on movement of an item performed by the cache server 1 according to the above-described embodiment will be described with reference to a flowchart illustrated in FIG. 10. The process illustrated in the flowchart of FIG. 10 may be started with the cache hit to any item cached in the DRAM 12 or the NAND flash memory 13 as a trigger.

The determination unit 113 determines whether an item X for which the cache hit occurs is arranged on the NAND flash memory 13 side (S1).

In a case where the item X is not arranged on the NAND flash memory 13 side (in other words, it is arranged on the DRAM 12 side) (No in S1), the process is ended without performing movement of the item X.

In a case where the item X is arranged on the NAND flash memory 13 side (Yes in S1), the determination unit 113 determines whether there is spare capacity to move the item X in the DRAM 12 (S2).

In a case where there is spare capacity in the DRAM 12 (Yes in S2), the determination unit 113 determines to move the item X from the NAND flash memory 13 to the DRAM 12 (S3). The process is ended.

In a case where there is no spare capacity in the DRAM 12 (No in S2), the second calculation unit 112 calculates an evaluation value $L_N(X)$ in a case where the item X is in the NAND flash memory 13. In addition, the first calculation unit 111 calculates an evaluation value $L_D(X)$ in a case where the item X is in the DRAM 12 (S4).

The first calculation unit 111 calculates an evaluation value $L_N(Y_j)$ in a case where J lower order items $Y_j$ on the DRAM 12 side LRU list are in the NAND flash memory 13. In addition, the second calculation unit 112 calculates an evaluation value $L_D(Y_j)$ in a case where the J lower order items $Y_j$ on the DRAM 12 side LRU list are in the DRAM 12 (S5). Here, J is a positive integer and is determined such that the data capacity for storing the item X is reserved in the DRAM 12. In other words, J is the minimum value such that the size of item X is equal to or less than the total size of one or more items $Y_j$. In addition, j is an integer of 1 or more and J or less.

The determination unit 113 determines whether there is still spare capacity in the DRAM 12 even when the item X is moved to the DRAM 12 (S6).

In a case where there is no spare capacity in the DRAM 12 (No in S6), the process proceeds to S8.

In a case where there is spare capacity in the DRAM 12 (Yes in S6), the process proceeds to S7. That is, the second calculation unit 112 calculates an evaluation value $L_N(X_i)$ in a case where the upper I items $X_i$ (except for the top item) on the NAND flash memory 13 side LRU list are in the NAND flash memory 13. In addition, the first calculation unit 111 calculates an evaluation value $L_D(X_i)$ in a case where the upper I items $X_i$ (except for the top item) on the NAND flash memory 13 side LRU list are in the DRAM 12 (S7). Here, I is a positive integer, and is determined such that the spare capacity of the DRAM 12 is filled. In other words, I is the maximum value such that the sum of the size of item X and the total size of one or more items $X_i$ is less than or equal to the spare capacity of the DRAM 12. Also, i is an integer of 1 or more and I or less.

The determination unit 113 determines whether the following Expression 5 is satisfied (S8). The $L_D(X)$, $L_D(X_i)$, and $L_D(Y_j)$ are calculated by multiplying the latency $L_{DRAM}$ (ItemSize) calculated using Expression 1 above and the access probability of the item. The $L_N(X)$, $L_N(X_i)$, and $L_N(Y_j)$ are calculated by multiplying the latency $L_{NAND}$ (ItemSize) calculated using Expression 2 described above and the access probability of the item.

$$L_N(X)+\Sigma L_N(X_i)+\Sigma L_D(Y_j)>L_D(X)+\Sigma L_D(X_i)+\Sigma L_N(Y_j) \quad \text{(Expression 5)}$$

In other words, the determination unit 113 determines whether the sum of the evaluation values before the movement of the items serving as candidates for movement is larger than the sum of the evaluation values after the movement of the items serving as candidates for movement.

In a case where Expression 5 is not satisfied (No in S8), the process is ended without moving the item X.

In a case where Expression 5 is satisfied (Yes in S8), the determination unit 113 determines to move the item X from the NAND flash memory 13 to the DRAM 12. In addition, when there are items $X_i$ serving as candidates for movement, the determination unit 113 determines to move the items $X_i$ from the NAND flash memory 13 to the DRAM 12. In addition, the determination unit 113 determines to move the items $Y_j$ from the DRAM 12 to the NAND flash memory 13 (S9). Then, the process is ended.

(B-4) Effect

According to the cache server 1 according to the above-described embodiment, for example, the following effects may be made.

The determination unit 113 determines the storage destination from among the DRAM 12 and the NAND flash memory 13 for the first and second data based on the access probability and the latency for the first and second data.

Therefore, the access performance to the data stored in the memory may be improved. Specifically, each cache data may be arranged in an appropriate cache memory based on the access probability and the latency.

The first calculation unit 111 calculates the first evaluation value using the access probability and the latency in a case where the data storage destination is changed between the DRAM 12 and the NAND flash memory 13. The second calculation unit 112 calculates a second evaluation value using the access probability and the latency in a case where the storage destination of data is not changed between the DRAM 12 and the NAND flash memory 13. In a case where the first evaluation value is smaller than the second evaluation value, the determination unit 113 determines the storage destination such that the first data in stored in the second memory and the second data is stored in the first memory.

Accordingly, while moving a large item to the NAND flash memory 13, a small item with a high access frequency is moved to the DRAM 12, the evaluation value in the entire cache memory may be lowered and the access performance may be improved.

The first evaluation value is the sum of the products of the access probability and the latency for the respective first and second data in a case of moving data between the DRAM 12 and the NAND flash memory 13. The second evaluation value is the sum of the products of the access probability and the latency for the respective first and second data in a case of not moving data between the DRAM 12 and the NAND flash memory 13.

With this, the calculation of the evaluation value may be accurately performed, and the reliability of the evaluation value may be improved. In addition, because the latency is not calculated for data other than data serving as candidates for movement, the calculation time may be shortened.

The determination unit 113 determines the storage destination by determining whether to replace the second data stored in the NAND flash memory 13 with the first data having the lowest access frequency among the data items stored in the DRAM 12.

Accordingly, data with low access frequency may be moved from the high-speed and low-capacity DRAM 12 to the low-speed and large-capacity NAND flash memory 13.

The read unit 114 reads data from the DRAM 12 or the NAND flash memory 13 in response to a data read request from the client 3. The access speed of the DRAM 12 is higher than that of the NAND flash memory 13. The determination unit 113 determines whether to replace the second data read from the NAND flash memory 13 by the read unit 114 with the first data stored in the DRAM 12.

Accordingly, the storage destination of each item may be determined with a matter that the order of items in the list of the DRAM 12 or the NAND flash memory 13 is replaced by the cache hit to each item as a trigger. Therefore, the determination of the storage destination may be implemented at an appropriate timing.

In a case where there is spare capacity in the DRAM 12 even when the replacement is performed, the determination unit 113 determines whether to move data other than the second data, which is read out by the read unit 114 from the NAND flash memory 13, to the DRAM 12.

As a result, the items may be moved to the DRAM 12 until the data capacity of the DRAM 12 with high access speed becomes full, and the evaluation value in the entire cache memory may be further improved.

In a case where data to be read by the client 3 is not stored in the DRAM 12 and the NAND flash memory 13, the write unit 115 writes the data acquired from the DBMS 2 to the DRAM 12 as first data. The determination unit 113 determines whether to replace the second data read by the read unit 114 from the NAND flash memory 13 with the first data written in the DRAM 12 by the write unit 115.

Accordingly, even in a case where an item newly cached from the DBMS 2 is arranged in the DRAM 12, an appropriate storage destination of the item may be determined based on the access probability and the latency of the item.

The data stored in the DRAM 12 and the NAND flash memory 13 are managed by the LRU algorithm.

Accordingly, the management of each item in the cache memory may be appropriately performed.

(C) First Modified Cache Server

In the example of the embodiment described above, the cache data stored in the DRAM 12 and the NAND flash memory 13 are managed by the LRU algorithm. However, the present disclosure is not limited thereto. For example, the cache data stored in the DRAM 12 and the NAND flash memory 13 may be managed by the LFU algorithm.

Figure 11:
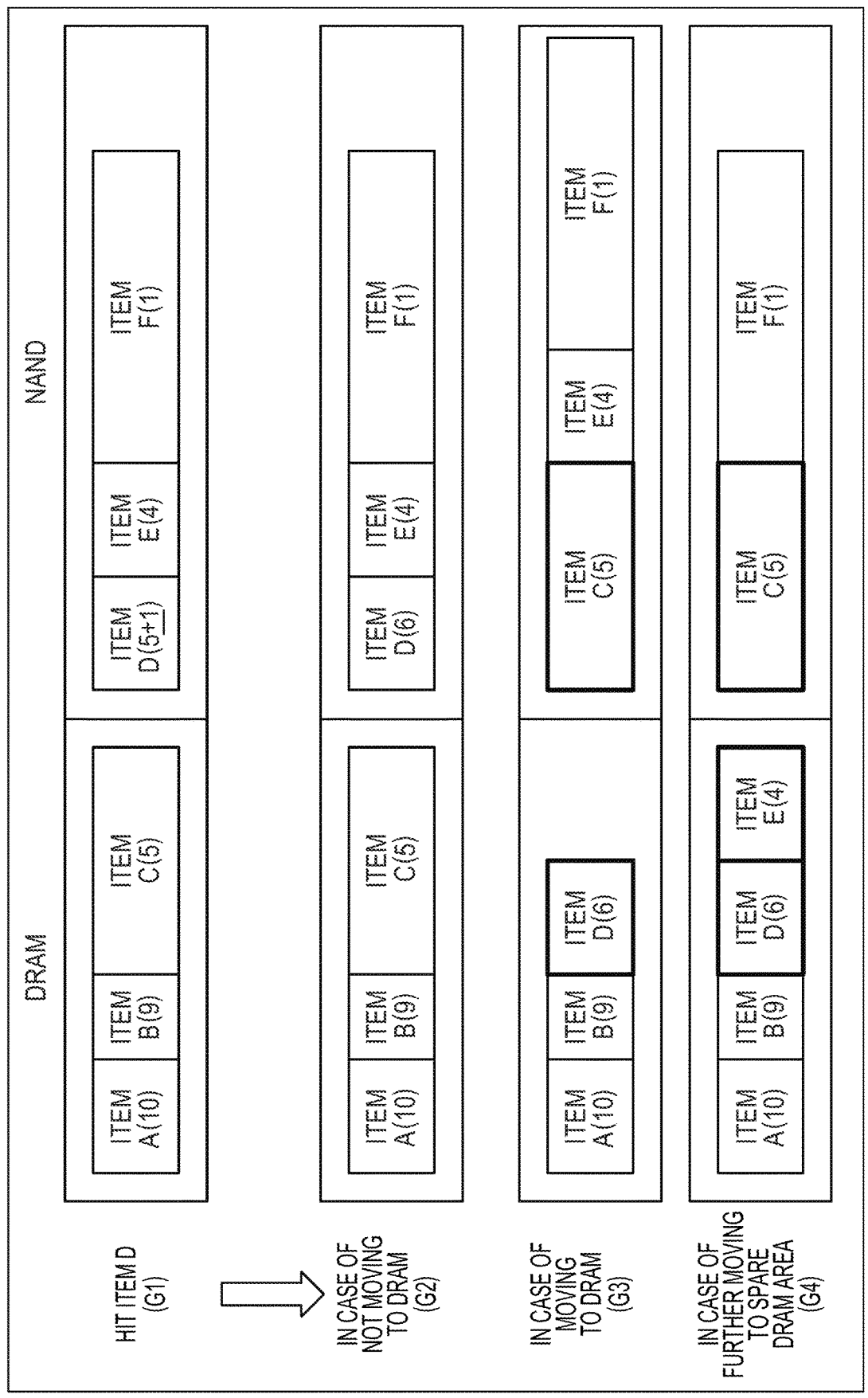
FIG. 11 is a diagram illustrating a process of moving an item performed by a first modified cache server.

FIG. 11 is a diagram illustrating a process of moving an item performed by a first modified cache server 1.

The sizes of the items A to F illustrated in FIG. 11 are proportional to the data size of each item. For example, the data size of the item A is larger than that of the item B, and the data size of the item B is smaller than that of the item C. In addition, the item A, the item D, and the item E have the same data size to each other.

As indicated in a state G1, cache data items are arranged in the order of the item A, the item B, the item C in the LFU list of the DRAM 12. In the LFU list of the NAND flash memory 13, the cache data items are arranged in the order of the item D, the item E, and the item F.

In the DRAM 12, the number of reference times of the items A, B, and C are 10 times, 9 times, and 5 times, respectively. In the NAND flash memory 13, the number of reference times of the items D, E, and F are 5 times, 4 times, and 1 time, respectively. That is, for each DRAM 12 and each NAND flash memory 13, each item is arranged in order of the number of reference times. Each time an item is read out, the number of reference times of the item may be updated by the read unit 114.

In this state, it is assumed that the cache hit for item D occurs. Therefore, the number of reference times of the item D increases from 5 times to 6 times.

As indicated in a state G2, in a case where the cache hit item D is not moved to the DRAM 12, similar to the case indicated in the state G1, the cache data items are arranged in the order of the item A, the item B, and the item C in the LFU list of the DRAM 12. In addition, similar to the case indicated in the state G1, in the LFU list of the NAND flash memory 13, the cache data items are arranged in the order of the item D, the item E, and the item F, starting with the item D of which the number of reference times is increased to 6 times.

As indicated in a state G3, in a case where the item D is moved to the DRAM 12, the item C arranged at the end of the LFU list of the DRAM 12 is moved to the NAND flash memory 13 in replace of the item D. In the LFU list of the DRAM 12, the arrangement of the cache data items changes to the order of the item A, the item B, and the item D, that is, the item D that is moved from the NAND flash memory 13 is arranged at the end. In addition, in the LFU list of the NAND flash memory 13, the arrangement of the cache data items changes to the order of the item C, the item E, and the item F, starting with the item C moved from the DRAM 12.

In the example illustrated in FIG. 11, the data size of item D is smaller than the data size of item C. Therefore, in the state G3, even when the item D is registered in the DRAM 12, there is spare capacity in the storage capacity of the DRAM 12.

Therefore, as indicated in a state G4, the item E secondly placed in the LFU list of the NAND flash memory 13 in the state G2 may also be moved to the DRAM 12 in addition to the item D. Accordingly, in the LFU list of the DRAM 12, the arrangement of the cache data items changes to the order of the item A, the item B, the item D, and the item E such that the item E that is additionally moved from the NAND flash memory 13 is arranged at the end. In addition, in the LFU list of the NAND flash memory 13, the arrangement of the cache data items is changed to the order of the item C and the item F such that the item E moved to the DRAM 12 is excluded.

In a case where the number of reference times of a cache hit item in the NAND flash memory 13 exceeds the number of reference times of the last item of the LFU list of the DRAM 12, the determination unit 113 may determine whether the movement of the item is to be implemented similarly as in the above-described embodiment. In the example indicated in the state G2 in FIG. 11, 6 times as the number of reference times of the cache hit item D in the NAND flash memory 13 exceeds 5 times as the number of reference times of the last item of the LRU list of the DRAM 12. Thus, the determination unit 113 determines whether to move the item between the DRAM 12 and the NAND flash memory 13 similarly as in the above-described embodiment.

A process of a determination on movement of an item performed by the first modified cache server 1 will be described with reference to flowcharts illustrated in FIGS. 12 and 13. The processes illustrated in the flowcharts of FIGS. 12 and 13 may be started with a cache hit to any item cached in the DRAM 12 or the NAND flash memory 13 as the trigger.

Figure 12:
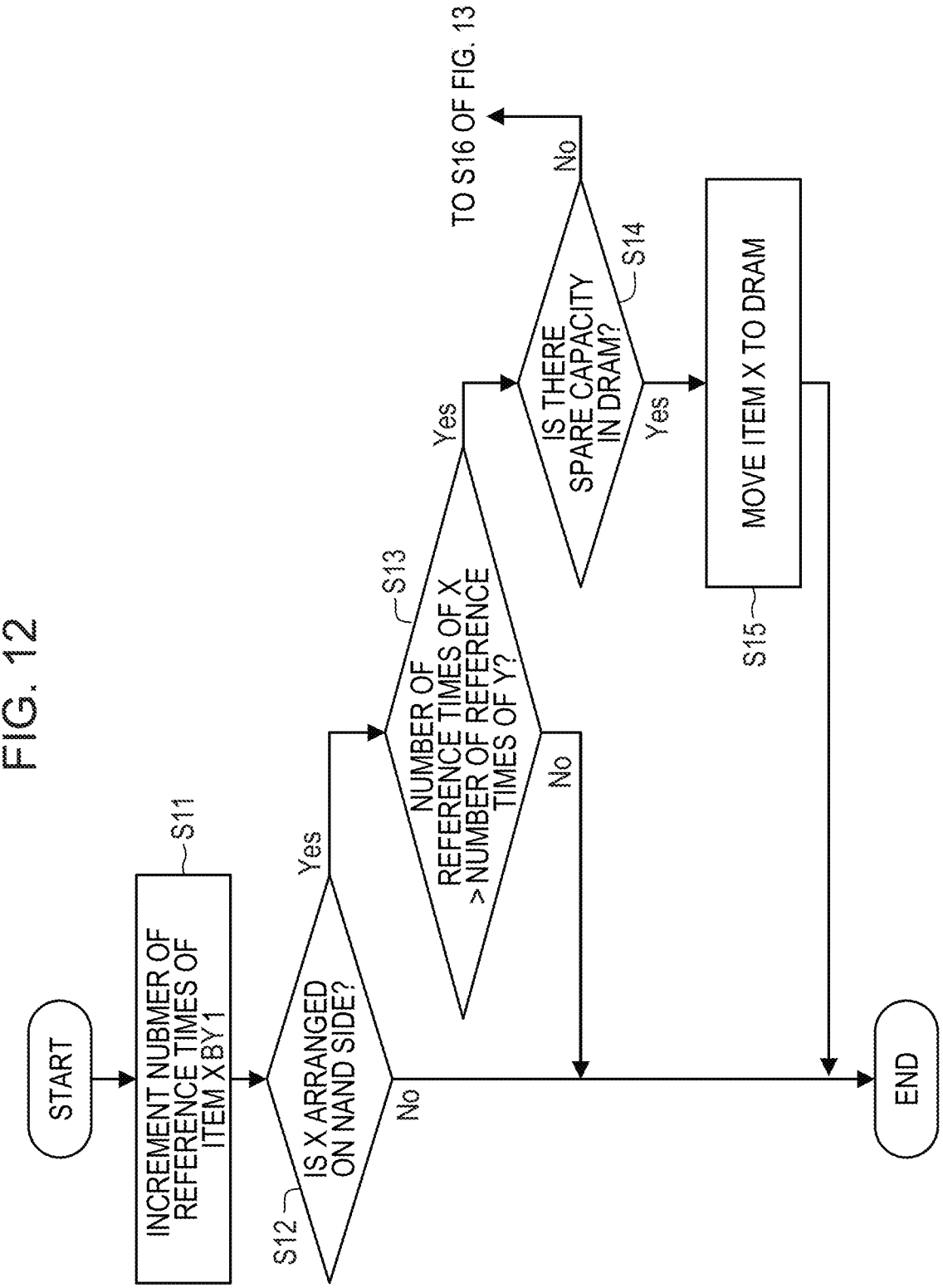
FIGS. 12 and 13 are flowcharts illustrating a process of a determination on movement of an item performed by a first modified cache server.

When a cache hit occurs for an item X, the read unit 114 increments the number of reference times of the item X by 1 (S11 in FIG. 12).

The determination unit 113 determines whether the item X is arranged on the NAND flash memory 13 side (S12 in FIG. 12).

In a case where the item X is not arranged on the NAND flash memory 13 side (in other words, it is arranged on the DRAM 12 side) (No in S12 of FIG. 12), the item X is not moved, the process is ended.

In a case where the item X is arranged on the NAND flash memory 13 side (Yes in S12 of FIG. 12), the determination unit 113 determines whether the number of reference times of the item X is larger than the number of reference times of the item Y (S13 of FIG. 12). Here, the item Y is the last item of the LFU list of the DRAM 12.

In a case where the number of reference times of the item X is equal to or less than the number of reference times of the item Y (No in S13 of FIG. 12), the item X is not moved and the process is ended.

In a case where the number of reference times of the item X is larger than the number of reference times of the item Y (Yes in the S13 of FIG. 12), the determination unit 113 determines whether there is spare capacity for moving the item X in the DRAM 12 (S14 of FIG. 12).

In a case where there is spare capacity in the DRAM 12 (Yes in S14 of FIG. 12), the determination unit 113 determines to move the item X from the NAND flash memory 13 to the DRAM 12 (S15 of FIG. 12). Then, the process is ended.

In a case where there is no spare capacity in the DRAM 12 (No in S14 of FIG. 12), the second calculation unit 112 calculates an evaluation value $LN_{avg}(X)$ in a case where the item X is in the NAND flash memory 13. In addition, the first calculation unit 111 calculates the evaluation value $LD_{avg}(X)$ in a case where the item X is in the DRAM 12 (S16 of FIG. 13).

The first calculation unit 111 calculates an evaluation value $LN_{avg}(Y_j)$ in a case where J lower order items $Y_j$ on the DRAM 12 side LFU list are in the NAND flash memory 13. In addition, the second calculation unit 112 calculates an evaluation value $LD_{avg}(Y_j)$ in a case where the J lower order items $Y_j$ on the DRAM 12 side LFU list are in the DRAM 12 (S17 of FIG. 13). Here, J is a positive integer and is determined such that the data capacity for storing the item X is reserved in the DRAM 12. In other words, J is the minimum value such that the size of item X is equal to or less than the total size of one or more items $Y_j$. In addition, j is an integer of 1 or more and J or less.

Figure 13:
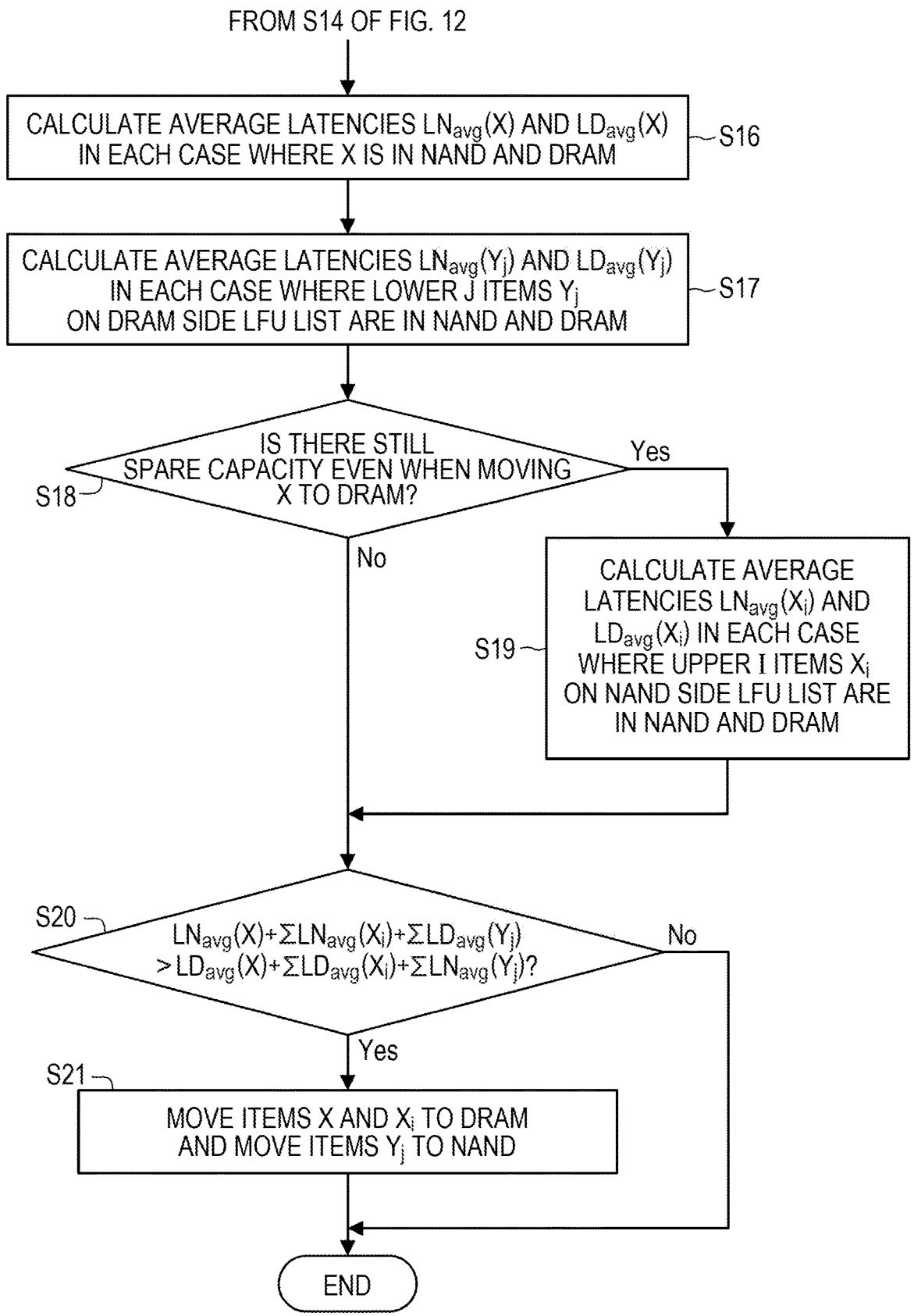

The determination unit 113 determines whether there is still spare capacity in the DRAM 12 even when the item X is moved to the DRAM 12 (S18 of FIG. 13).

In a case where there is no spare capacity in the DRAM 12 (No in S18 of FIG. 13), the process proceeds to S20 of FIG. 13.

In a case where there is spare capacity in the DRAM 12 (Yes in S18 of FIG. 13), the process proceeds to S19 of FIG. 13. The second calculation unit 112 calculates an evaluation value $LN_{avg}(X_i)$ in a case where the upper I items $X_i$ (except for the top item) on the NAND flash memory 13 side LFU list are in the NAND flash memory 13. In addition, the first calculation unit 111 calculates an evaluation value $LD_{avg}(X_i)$ in a case where the upper I items $X_i$ (except for the top item) on the NAND flash memory 13 side LFU list are in the DRAM 12 (S19 of FIG. 13). Here, I is a positive integer, and is determined such that the spare capacity of the DRAM 12 is filled. In other words, I is the maximum value such that the sum of the size of item X and the total size of one or more items $X_i$ is less than or equal to the spare capacity of the DRAM 12. Also, i is an integer of 1 or more and I or less.

The determination unit 113 determines whether the following Expression 6 is satisfied (S20 of FIG. 13). The $LD_{avg}(X)$, $LD_{avg}(X_i)$, and $LD_{avg}(Y_j)$ are calculated by multiplying the latency $L_{DRAM}(ItemSize)$ calculated using Expression 1 above and the access probability of the item. The $LN_{avg}(X)$, $LN_{avg}(X_i)$, and $LN_{avg}(Y_j)$ are calculated by multiplying the latency $L_{NAND}(ItemSize)$ calculated using Expression 2 described above and the access probability of the item.

$$LN_{avg}(X)+\Sigma LN_{avg}(X_i)+\Sigma LD_{avg}(Y_j) > LD_{avg}(X)+\Sigma LD_{avg}(X_i)+\Sigma LN_{avg}(Y_j) \qquad \text{(Expression 6)}$$

In other words, the determination unit 113 determines whether the sum of the evaluation values before the movement of the items serving as candidates for movement is larger than the sum of the evaluation values after the movement of the items serving as candidates for movement.

In a case where Expression 6 is not satisfied (No in S20 of FIG. 13), the process is ended without moving the item X.

In a case where Expression 6 is satisfied (Yes in S20 of FIG. 13), the determination unit 113 determines to move the item X from the NAND flash memory 13 to the DRAM 12. In addition, when there are items $X_i$ serving as candidates for movement, the determination unit 113 determines to move the items $X_i$ from the NAND flash memory 13 to the DRAM 12. In addition, the determination unit 113 determines to move the items $Y_j$ from the DRAM 12 to the NAND flash memory 13 (S21 of FIG. 13). Then, the process is ended.

According to the first modified cache server 1, in addition to the above-described effects which may be made in the embodiment, for example, the following effects may be made.

The data stored in the DRAM 12 and the NAND flash memory 13 are managed by the LFU algorithm. Accordingly, the management of each item in the cache memory may be appropriately performed.

(D) Second Modified Cache Server

In the above-described embodiment and the first modified cache server, whether to move an item between the DRAM 12 and the NAND flash memory 13 is determined by using the cache hit to the item as the trigger. However, it is not limited thereto. For example, whether to move an item between the DRAM 12 and the NAND flash memory 13 may be determined in the background asynchronously with the cache hit to the item.

A process of replacing items is started at regular time intervals (for example, every 1 second) and may be performed for a predetermined number of higher items (for example, 10 items) in the list of the NAND flash memory 13. The predetermined number may be referred to as the upper limit of the number of times of determination on replacement.

Figure 14:
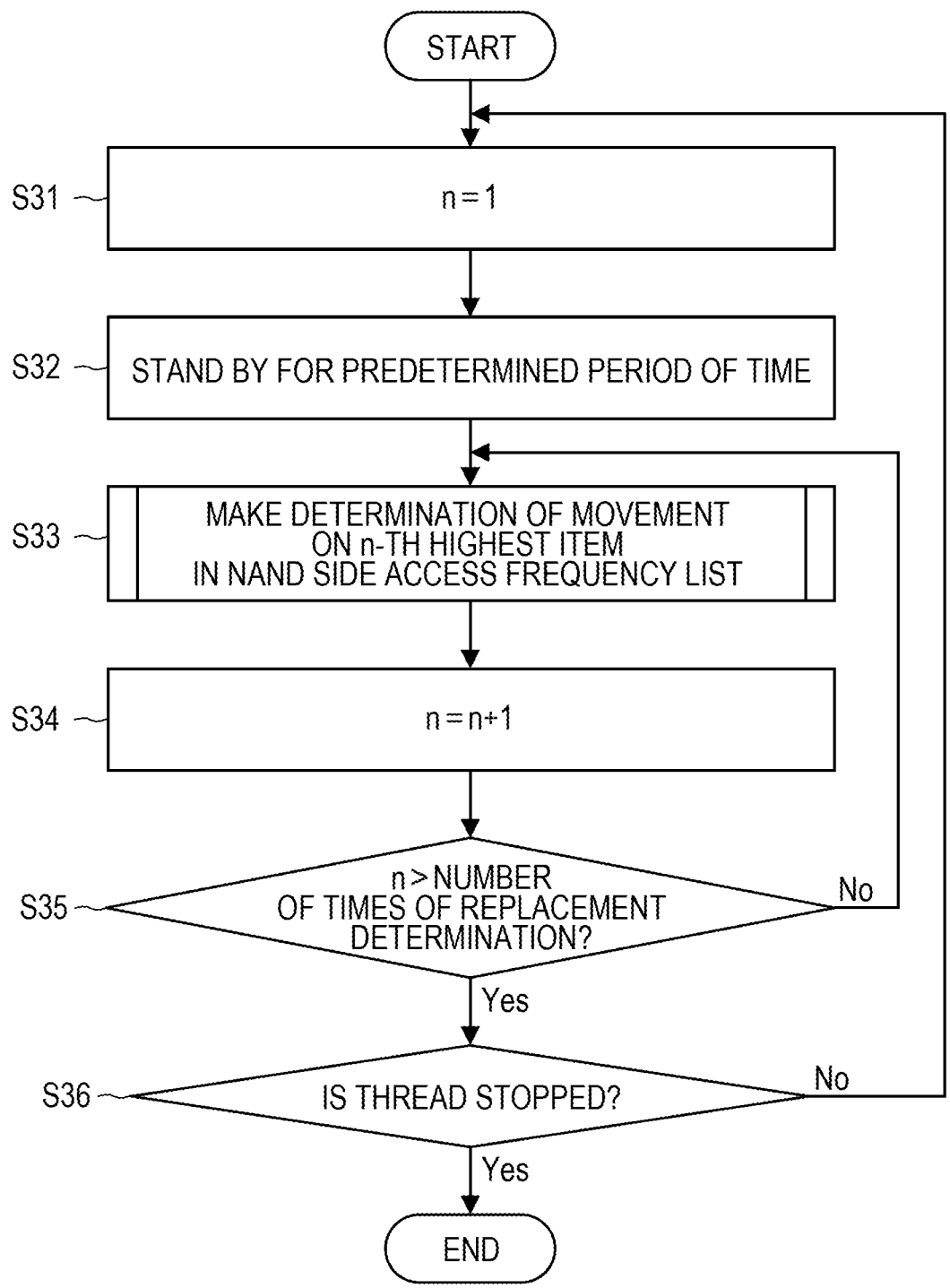
FIG. 14 is a flowchart illustrating a process of determining a start timing of a determination on movement of an item performed by a second modified cache server.

The process of determining a start timing of a determination on movement of an item performed by a second modified cache server 1 will be described with reference to the flowchart illustrated in FIG. 14.

The determination unit 113 sets a variable n to 1 (S31).

The determination unit 113 stands by the process for a predetermined period of time (S32).

The determination unit 113 makes determination of movement on the n-th highest item in the NAND flash memory 13 side access frequency list (S33). Details of the process in S33 are the same as those described above with reference to FIGS. 10, 12, and 13.

The determination unit 113 increments the variable n by 1 (S34).

The determination unit 113 determines whether the variable n is larger than the upper limit of the number of times of determination on replacement (S35).

In a case where the variable n is equal to or less than the upper limit of the number of times of determination on replacement (No in S35), the process returns to S33.

In a case where the variable n is larger than the upper limit of the number of times of determination on replacement (Yes in S35), the determination unit 113 determines whether a thread is stopped (S36).

In a case where the thread is not stopped (No in S36), the process returns to S31.

In a case where the thread is stopped (Yes in S36), the process is ended.

According to the second modified cache server 1, in addition to the above-described effects which may be made in the embodiment, for example, the following effects may be made.

Every time a predetermined time period elapses, the determination unit 113 determines whether to replace second data stored in the NAND flash memory 13 with first data stored in the DRAM 12.

Accordingly, because determination on storage destination of an item may be made asynchronously with an access to the cache data from the client 3, the load on the cache server 1 may be reduced.

(E) Others

The disclosed technology is not limited to the above-described embodiments, and various modifications may be made without departing from the gist of the present embodiment. Each configuration and each process of the present embodiment may be selected as desired or may be combined as appropriate.

For example, in the embodiment and the modifications described above, the cache server 1 determines the storage destination of data in the cache memory, but the present disclosure is not limited thereto. For example, by providing the hierarchical cache memory inside the CPU (not illustrated) of the client 3 illustrated in FIG. 7, the client 3 using the cache data may determine, by itself, the storage destination of the data in the cache memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
   a first memory configured to store data and having a first access speed;
   a second memory configured to store data and having a second access speed different from the first access speed; and
   a processor coupled to the first memory and the second memory and the processor configured to:
   calculate a first access probability and a first latency of first data stored in the first memory;
       calculate a second access probability and a second latency of second data stored in the second memory;
       calculate, using the first and second access probabilities and the first and second latencies, a first evaluation value in a case where storage destinations of the first data and the second data are changed between the first memory and the second memory;
       calculate, using the first and second access probabilities and the first and second latencies, a second evaluation value in a case where the storage destinations of the first data and the second data are not changed; and
       determine, in a case where the first evaluation value is smaller than the second evaluation value, the storage destinations such that the first data is stored in the second memory and the second data is stored in the first memory.

2. The information processing apparatus according to claim 1, wherein
   the first evaluation value is a sum of a product of the first access probability and the first latency and a product of the second access probability and the second latency in a case where data is moved between the first memory and the second memory, and
   the second evaluation value is a sum of a product of the first access probability and the first latency and a product of the second access probability and the second latency in a case where data is not moved between the first memory and the second memory.

3. The information processing apparatus according to claim 1, wherein
   the first access speed is higher than the second access speed,
   a first access frequency of the first data is smallest of access frequencies of data stored in the first memory, and
   the processor is further configured to:
       determine the storage destinations by determining whether to perform replacement of the second data with the first data.

4. The information processing apparatus according to claim 1, wherein
   the first access speed is higher than the second access speed, and
   the processor is further configured to:
       receive a read request from a higher-level device, the read request requesting to read to-be-read data;
       read the to-be-read data from the first memory or the second memory in response to the read request; and
       determine the storage destinations by determining whether to perform replacement of the second data with the first data, the second data being read from the second memory in response to the read request from the higher-level device.

5. The information processing apparatus according to claim 4, wherein
   the processor is configured to:
       determine, in a case where there is spare capacity in a capacity of the first memory even after performing the replacement, whether to move a third data stored in the second memory to the first memory in addition to the second data, the third data being different from the second data.

6. The information processing apparatus according to claim 4, wherein
   the processor is configured to:
       acquire the to-be-read data from a storage device different from the first memory and the second memory in response to the read request in a case where the to-be-read data is stored in neither the first memory nor the second memory;
       write the to-be-read data acquired from the storage device in the first memory as the first data;
       determine the storage destinations by determining whether to perform replacement of the second data with the first data, the second data being read from the second memory in response to the read request from the higher-level device, the first data being acquired from the storage device and written in the first memory.

7. The information processing apparatus according to claim 1, wherein
   the first access speed is higher than the second access speed, and
   the processor is configured to:
       determine the storage destination by determining whether to perform replacement of the second data with the first data each time a predetermined period of time elapses.

8. The information processing apparatus according to claim 1, wherein
   the processor is configured to:
       manage data stored in the first memory and the second memory by a Least Recently Used algorithm.

9. The information processing apparatus according to claim 1, wherein
   the processor is configured to:
       manage data stored in the first memory and the second memory by a Least Frequently Used algorithm.

10. A non-transitory computer-readable recording medium having stored therein a program that causes a computer to execute a process, the process comprising:
- calculating a first access probability and a first latency of first data stored in a first memory having a first access speed;
- calculating a second access probability and a second latency of second data stored in a second memory having a second access speed different from the first access speed;
- calculating, using the first and second access probabilities and the first and second latencies, a first evaluation value in a case where storage destinations of the first data and the second data are changed between the first memory and the second memory;
- calculating, using the first and second access probabilities and the first and second latencies, a second evaluation value in a case where the storage destinations of the first data and the second data are not changed; and
- determining, in a case where the first evaluation value is smaller than the second evaluation value, the storage destinations such that the first data is stored in the second memory and the second data is stored in the first memory.

11. The non-transitory computer-readable recording medium according to claim 10, wherein
- the first evaluation value is a sum of a product of the first access probability and the first latency and a product of the second access probability and the second latency in a case where data is moved between the first memory and the second memory, and
- the second evaluation value is a sum of a product of the first access probability and the first latency and a product of the second access probability and the second latency in a case where data is not moved between the first memory and the second memory.

12. The non-transitory computer-readable recording medium according to claim 10, wherein
- the first access speed is higher than the second access speed,
- a first access frequency of the first data is smallest of access frequencies of data stored in the first memory, and
- the process further comprises:
  - determining the storage destinations by determining whether to perform replacement of the second data with the first data.

13. The non-transitory computer-readable recording medium according to claim 10, wherein
- the first access speed is higher than the second access speed, and
- the process further comprises:
  - receiving a read request from a higher-level device, the read request requesting to read to-be-read data;
  - reading the to-be-read data from the first memory or the second memory in response to the read request; and
  - determining the storage destinations by determining whether to perform replacement of the second data with the first data, the second data being read from the second memory in response to the read request from the higher-level device.

14. An information processing method, comprising:
- calculating, by a computer, a first access probability and a first latency of first data stored in a first memory having a first access speed;
- calculating a second access probability and a second latency of second data stored in a second memory having a first access speed different from the first access speed;
- calculating, using the first and second access probabilities and the first and second latencies, a first evaluation value in a case where storage destinations of the first data and the second data are changed between the first memory and the second memory;
- calculating, using the first and second access probabilities and the first and second latencies, a second evaluation value in a case where the storage destinations of the first data and the second data are not changed; and
- determining, in a case where the first evaluation value is smaller than the second evaluation value, the storage destinations such that the first data is stored in the second memory and the second data is stored in the first memory.

15. The information processing method according to claim 14, wherein
- the first evaluation value is a sum of a product of the first access probability and the first latency and a product of the second access probability and the second latency in a case where data is moved between the first memory and the second memory, and
- the second evaluation value is a sum of a product of the first access probability and the first latency and a product of the second access probability and the second latency in a case where data is not moved between the first memory and the second memory.

16. The information processing method according to claim 14, wherein
- the first access speed is higher than the second access speed,
- a first access frequency of the first data is smallest of access frequencies of data stored in the first memory, and
- the information processing method further comprises:
  - determining the storage destinations by determining whether to perform replacement of the second data with the first data.

17. The information processing method according to claim 14, wherein
- the first access speed is higher than the second access speed, and
- the information processing method further comprises:
  - receiving a read request from a higher-level device, the read request requesting to read to-be-read data;
  - reading the to-be-read data from the first memory or the second memory in response to the read request; and
  - determining the storage destinations by determining whether to perform replacement of the second data with the first data, the second data being read from the second memory in response to the read request from the higher-level device.

* * * * *